United States Patent [19]
Kallenberger et al.

[11] Patent Number: 5,603,174
[45] Date of Patent: *Feb. 18, 1997

[54] DRAGLINE INCLUDING IMPROVED WALKING MECHANISM

[75] Inventors: Harvey J. Kallenberger, Wind Lake; Joseph L. Huffman, Mukwonago, both of Wis.

[73] Assignee: Harnischfeger Corporation, Brookfield, Wis.

[ * ] Notice: The term of this patent shall not extend beyond the expiration date of Pat. No. 5,600,905.

[21] Appl. No.: 384,704

[22] Filed: Feb. 3, 1995

[51] Int. Cl.$^6$ .................................................. E02F 3/48
[52] U.S. Cl. .............................. 37/394; 37/397; 37/396; 180/8.1; 180/8.5; 74/606 R
[58] Field of Search .................................. 74/606 R, 405; 475/331, 346; 384/434, 584, 559, 537; 180/8.1, 8.5, 8.6; 212/175, 179, 247; 37/394, 397, 396, 395

[56] References Cited

U.S. PATENT DOCUMENTS

| | | | |
|---|---|---|---|
| 1,010,976 | 12/1911 | Sundh | 74/606 R |
| 1,011,180 | 12/1911 | Freemann | 74/606 R |
| 1,101,460 | 6/1914 | Martinson | 180/8.5 |
| 1,155,163 | 9/1915 | Rice | 74/606 R |
| 1,627,984 | 5/1927 | Martinson | 180/8.5 |
| 2,179,765 | 11/1939 | Stock | 180/8.5 |
| 2,420,675 | 5/1947 | Page | 180/8.5 |
| 2,492,548 | 12/1949 | Armstrong | 180/8.5 |
| 2,541,496 | 2/1951 | Busick, Jr. et al. | 180/8.5 |
| 3,078,941 | 2/1963 | Baron et al. | 180/8.5 |
| 3,241,397 | 3/1966 | Wilkinson | 74/606 R |
| 3,500,945 | 3/1970 | Barden et al. | 180/8.5 |
| 3,739,652 | 6/1973 | Caldwell et al. | 212/175 X |
| 3,799,003 | 3/1974 | Van Dest | 475/288 X |
| 3,989,323 | 11/1979 | Lambert | 384/434 |
| 4,252,204 | 2/1981 | Bishop | 180/8.5 |
| 4,307,621 | 12/1981 | Merron | 74/421 A |
| 5,078,285 | 1/1992 | Geyer et al. | 212/247 |
| 5,245,882 | 9/1993 | Kallenberger et al. | 74/405 |
| 5,320,431 | 6/1994 | Kallenberger | 384/322 |
| 5,347,880 | 9/1994 | Kallenberger | 74/447 |
| 5,398,396 | 3/1995 | Sanders et al. | |

Primary Examiner—Terry Lee Melius
Assistant Examiner—Thomas A. Beach
Attorney, Agent, or Firm—Michael, Best & Friedrich

[57] ABSTRACT

A dragline comprising a main housing, a bucket hoist mechanism mounted on the housing, a bucket drag mechanism mounted on the main housing, a walking mechanism for moving the main housing over the ground, the walking mechanism including a motor mounted on the main housing, a planetary transmission which is mounted on the main housing and which is driven by the motor, a transmission output shaft driven by the transmission, a walk leg housing connected to the output shaft via an output pinion, a driven gear, and a driven eccentric such that rotation of the output shaft causes walking movement of the walk leg housing, and a shoe fixed to the walk leg housing for engaging the ground during walking movement of the walk leg housing, a boom extending from the main housing, a bucket, a hoist rope extending between the bucket and the bucket hoist mechanism and over the sheave for causing vertical movement of the bucket, and a drag rope extending between the bucket and the bucket drag mechanism for causing horizontal movement of the bucket.

20 Claims, 7 Drawing Sheets

DRAGLINE INCLUDING IMPROVED WALKING MECHANISM

BACKGROUND OF THE INVENTION

Field of the Invention

The invention relates to a walking mechanism for draglines.

Discussion of Prior Art

A walking dragline typically includes a main housing and a boom which extends upwardly and outwardly from the main housing and has thereon a sheave for supporting a hoist rope. The hoist rope extends from a bucket hoist mechanism and over the sheave to a bucket for causing vertical movement of the bucket. A drag rope extends between a bucket drag mechanism and the bucket for causing horizontal movement of the bucket. The main housing is supported by a tub that sits on the ground when the dragline is engaged in digging operations. A pair of walking mechanisms are mounted on the opposite sides of the main housing and are operable for moving the main housing over the ground between digging operations. An overhead crane is mounted in the interior of the main housing for lifting and moving components for repairs.

U.S. Pat. No. 5,245,882 discloses a walking mechanism of ordinary construction. A walking mechanism ordinarily includes a shoe for engaging the ground during walking movement. The shoe is fixed to a walk leg housing which is mounted on an eccentric and which is connected by a knee link to the main housing, such that rotation of the eccentric causes the walk leg housing to pivot, thereby causing walking movement of the shoe. The eccentric is fixed to a main walk shaft and rotates at about one revolution per minute. The main walk shaft is driven by a large diameter driven gear which is spline fit to the main walk shaft. The driven gear is driven by an output pinion mounted on the output shaft of a large gear box. The gear box is driven by a large motor.

SUMMARY OF THE INVENTION

On one known dragline, the walking mechanism gear box is mounted on the main surface or floor of the main housing adjacent the driven gear, and is so large that it reduces access to the driven gear, the main walk shaft, the eccentric and the walk leg housing with the overhead crane, and thus increases the difficulty of repairing these components. Also because the gear box is so large, the large motor is elevated far above the floor of the main housing. Further, the gear box and motor must be accessed from elevated platforms constructed specifically for this purpose. The gear box components typically are exposed for lubrication. Also, the gear boxes for the walking mechanisms on opposite sides of the main housing are not interchangeable, so different gear boxes must be constructed for each walking mechanism.

The invention provides an improved moving mechanism for a dragline. Preferably, the moving mechanism includes a walking mechanism. Specifically, the walking mechanism includes a motor which is fixed to the main housing floor. The walking mechanism also includes a cradle which is mounted on the main housing floor. The walking mechanism includes a pedestal which is spaced from the cradle and which is fixed to the main housing floor. The pedestal includes an inboard leg having therein an inboard bore and an outboard leg having therein an outboard bore. The outboard leg includes a base portion which extends upwardly from the main housing floor and defines the lower half of the outboard bore. The outboard leg also includes a cap portion removably fixed to the base portion. The cap portion defines the upper half of the outboard bore.

The walking mechanism includes a planetary transmission supported by the cradle and by the pedestal, as described below. The transmission has a horizontal center axis and includes an input shaft which is generally coaxial with the motor output shaft. A spacer coupling releasably and drivingly connects the motor output shaft to the transmission input shaft. The transmission includes an input end housing supported by the cradle. A reduction gear is rotatably supported by the input end housing and is driven by an input pinion fixed to the input shaft. A first sun gear is fixed to the reduction gear for common rotation therewith about the center axis of the transmission. First planet gears mesh with the first sun gear and a first ring gear and thus revolve about the first sun gear and the center axis. A first carrier is connected by pins to the first planet gears and thus rotates about the center axis. A second sun gear is fixed to the first carrier for common rotation therewith about the center axis. Second planet gears mesh with the second sun gear and a second ring gear and thus revolve about the second sun gear and the center axis. A second carrier is connected by pins to the second planet gears and thus rotates about the center axis. The transmission also includes a pilot member which is fixed to the second ring gear, which extends into the inboard bore of the pedestal, and which is supported by the inboard leg of the pedestal.

The walking mechanism includes an output shaft which is centered on the center axis. The inner end of the output shaft is spline fit to the second carrier and rotatably supported by the transmission, and the outer end of the output shaft is rotatably supported by a bearing capsule housed in the outboard bore in the outboard leg of the pedestal. An output pinion is fixed to the output shaft for common rotation therewith about the center axis. The outer diameter of the output pinion is less than the inner diameter of the outboard bore in the outboard leg of the pedestal. The bearing capsule and the output shaft having the output pinion thereon thus can be removed from the pedestal by moving the output shaft and pinion away from the transmission in the direction along the center axis and through the outboard bore, without removing the cap portion from the base portion of the outboard leg and without removing the transmission from the pedestal. The bearing capsule, the output shaft and the output pinion can also be removed from the pedestal by removing the cap portion of the pedestal, moving the output shaft and pinion away from the transmission to disconnect the output shaft from the second carrier, and lifting the bearing carrier, the output shaft and the output pinion.

The walking mechanism includes a driven gear which is driven by the output pinion. The driven gear is fixed to a main walk shaft and is rotatably supported on the main housing for rotation about a generally horizontal axis. A driven eccentric also is fixed to the main walk shaft for common rotation therewith. A walk leg housing is connected to a knee link and to the driven eccentric such that rotation of the driven eccentric causes walking movement of the walk leg housing. A shoe is fixed to the walk leg housing for engaging the ground during walking movement of the walk leg housing.

It is advantageous that the transmission can readily be removed from the cradle and pedestal with the overhead crane without also removing the motor from the main housing floor. Specifically, the transmission can be removed by disconnecting the spacer coupling between the motor output shaft and the transmission input shaft, disconnecting the transmission from the cradle and the pedestal, and moving the transmission toward the motor to remove the pilot member from the inboard bore of the pedestal. The transmission must also be moved far enough to disconnect the transmission output shaft from the second carrier, or else the output shaft must be moved away from the motor far enough to disconnect the transmission output shaft from the second carrier. Thereafter, the transmission can be lifted away from the cradle and the pedestal.

It is an advantage that the output shaft can be removed from the transmission and the outboard bore of the pedestal either by moving the output shaft and output pinion away from the transmission and outwardly through the outboard bore, or by removing the cap portion from the base portion of the outboard leg, moving the output shaft away from the transmission to disconnect the output shaft from the second carrier, and then moving the output shaft upwardly away from the base portion of the outboard leg.

It is a further advantage that the output shaft and output pinion are removable without removing the driven gear from the main walk shaft.

It is an advantage that the transmission and motor are mounted on the main housing floor and can be accessed for repairs and maintenance by personnel standing on the main housing floor.

It is also an advantage that the driven gear, the main walk shaft, the eccentric and the walk leg housing can be reached and lifted with a crane.

It is advantageous that the input end housing, the first ring gear, the second ring gear, and the pilot member together comprise a fluid-tight housing of the transmission. The housing contains lubrication fluid in which the internal components of the transmission are immersed.

It is a further advantage that the transmission is suitable for use in both walking mechanisms of the dragline. The transmission is simply rotated about its center axis when used on the opposite side of the dragline.

Other features and advantages of the invention will become apparent to those skilled in the art upon review of the following detailed description, claims and drawings.

Figure 1:
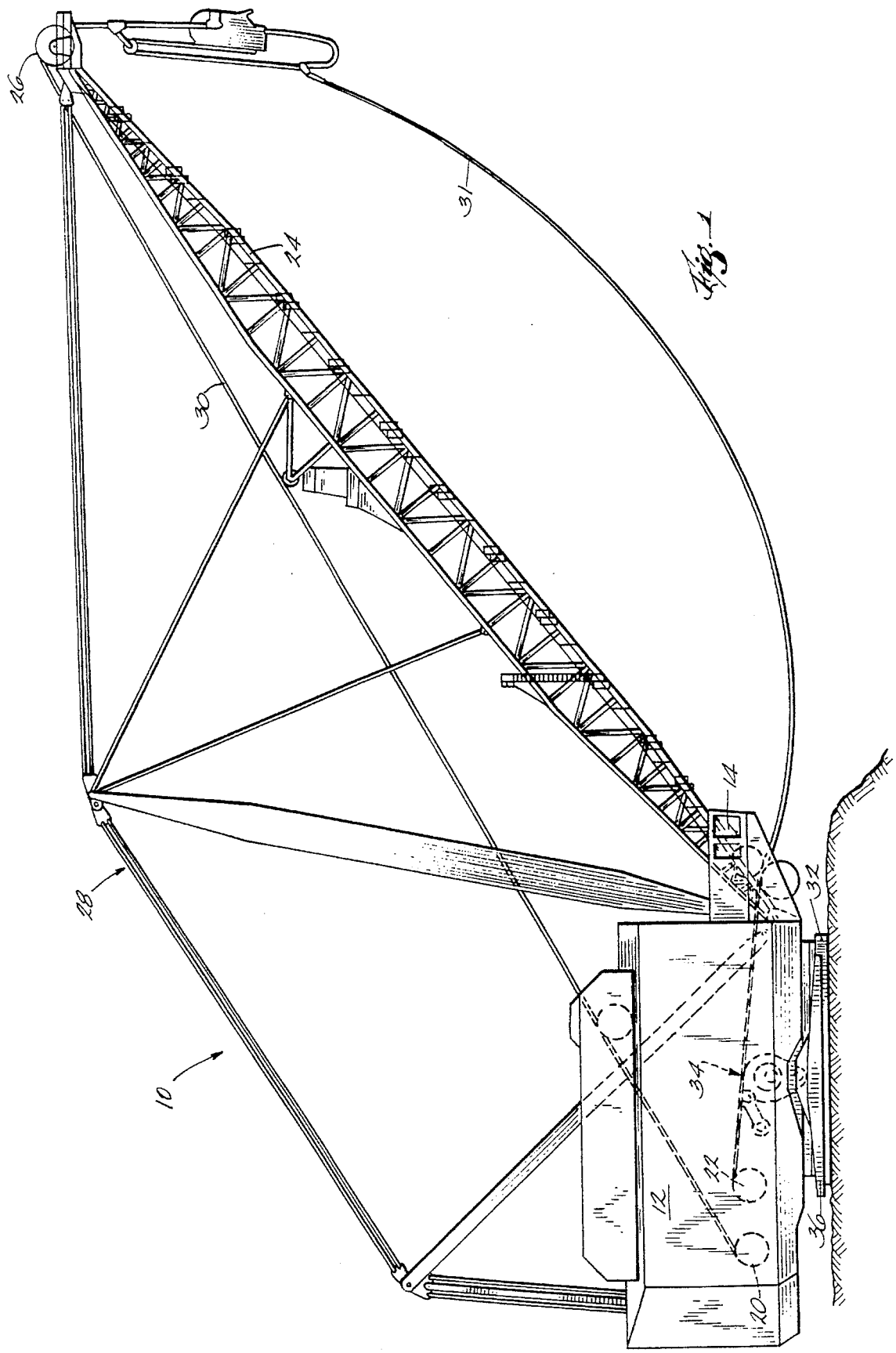
FIG. 1 is a side elevational view of a dragline embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 2:
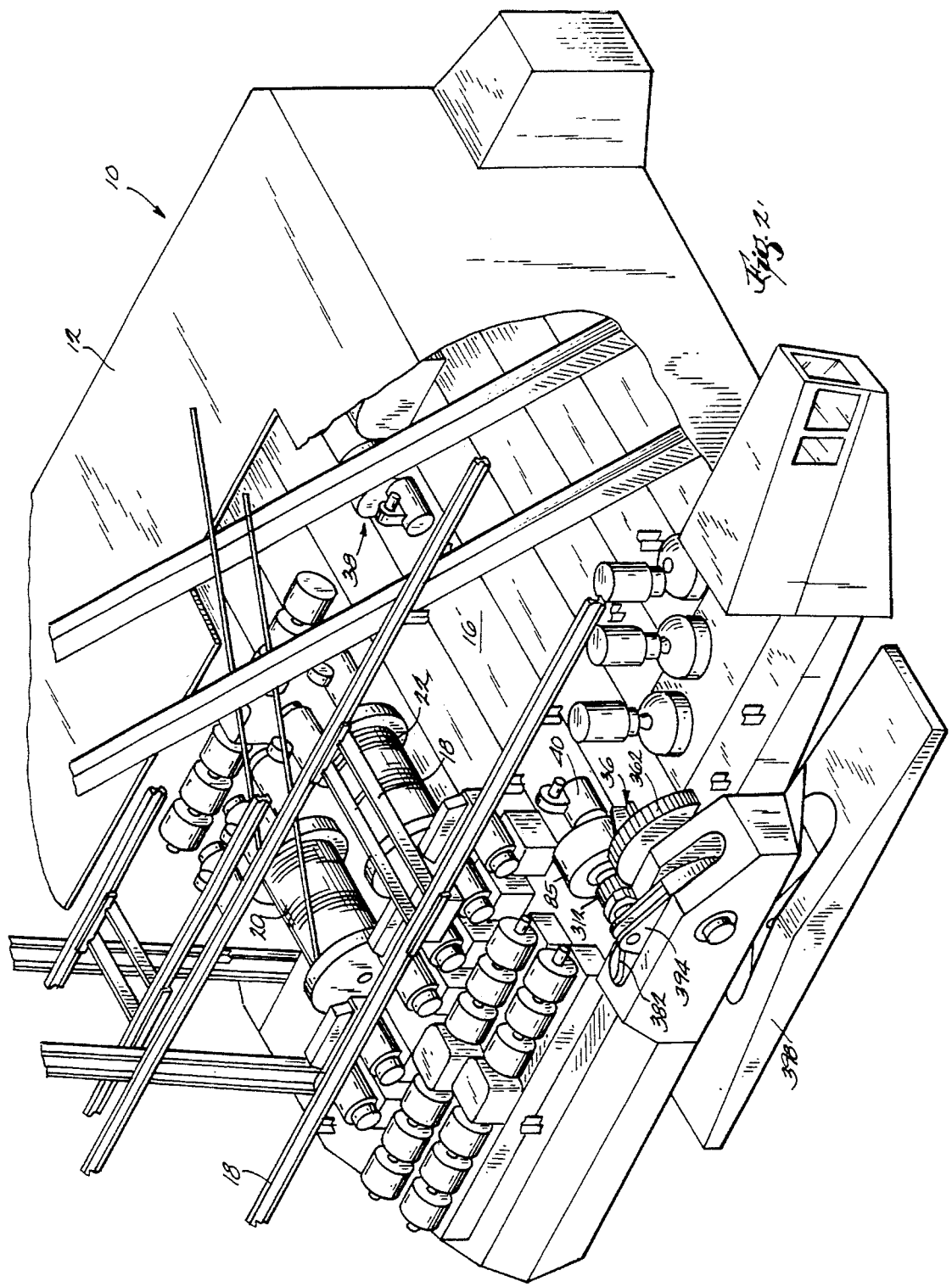
FIG. 2 is a partial perspective view of the main housing.
Figure 3:
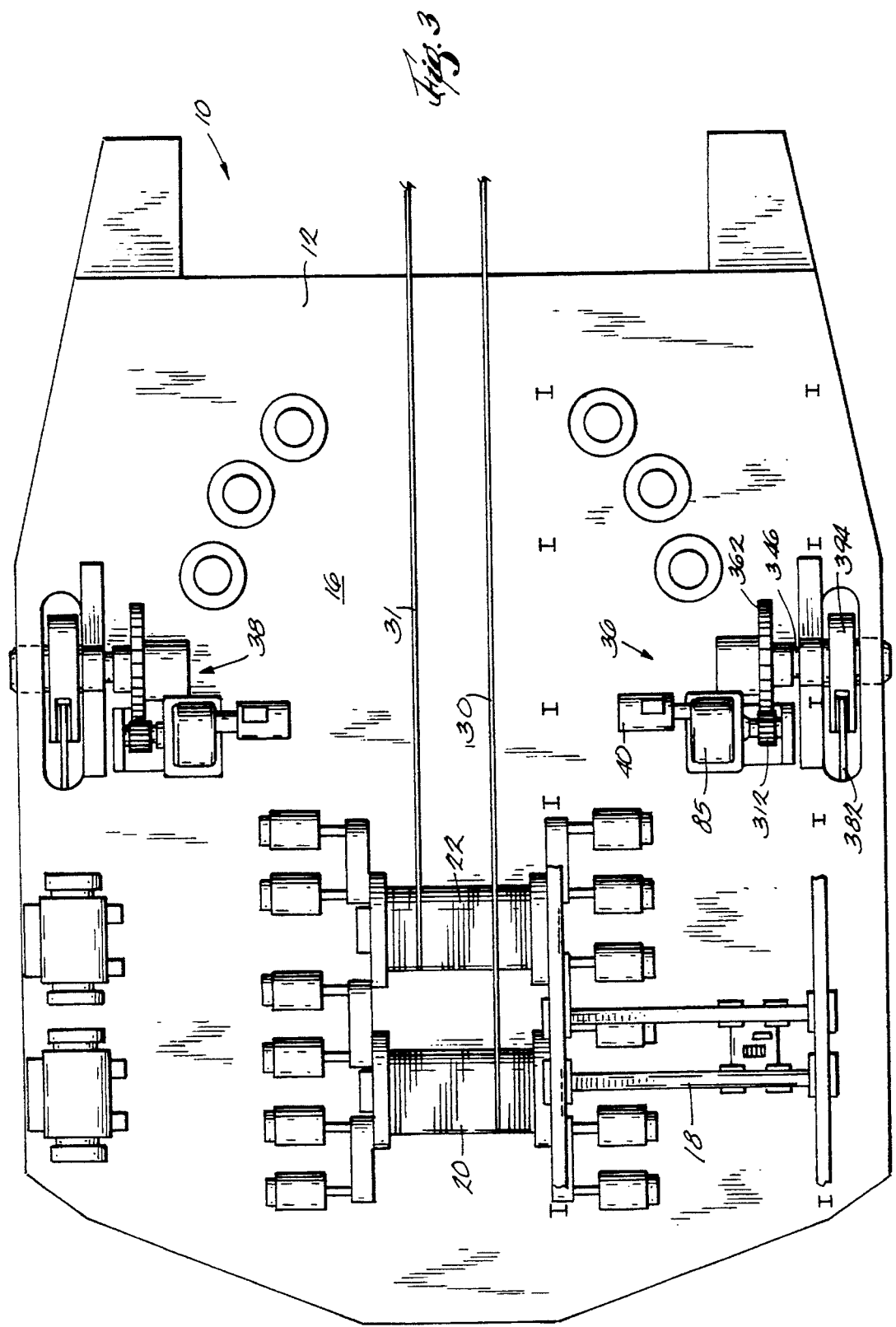
FIG. 3 is a partial top plan view of the main housing.
Figure 4:
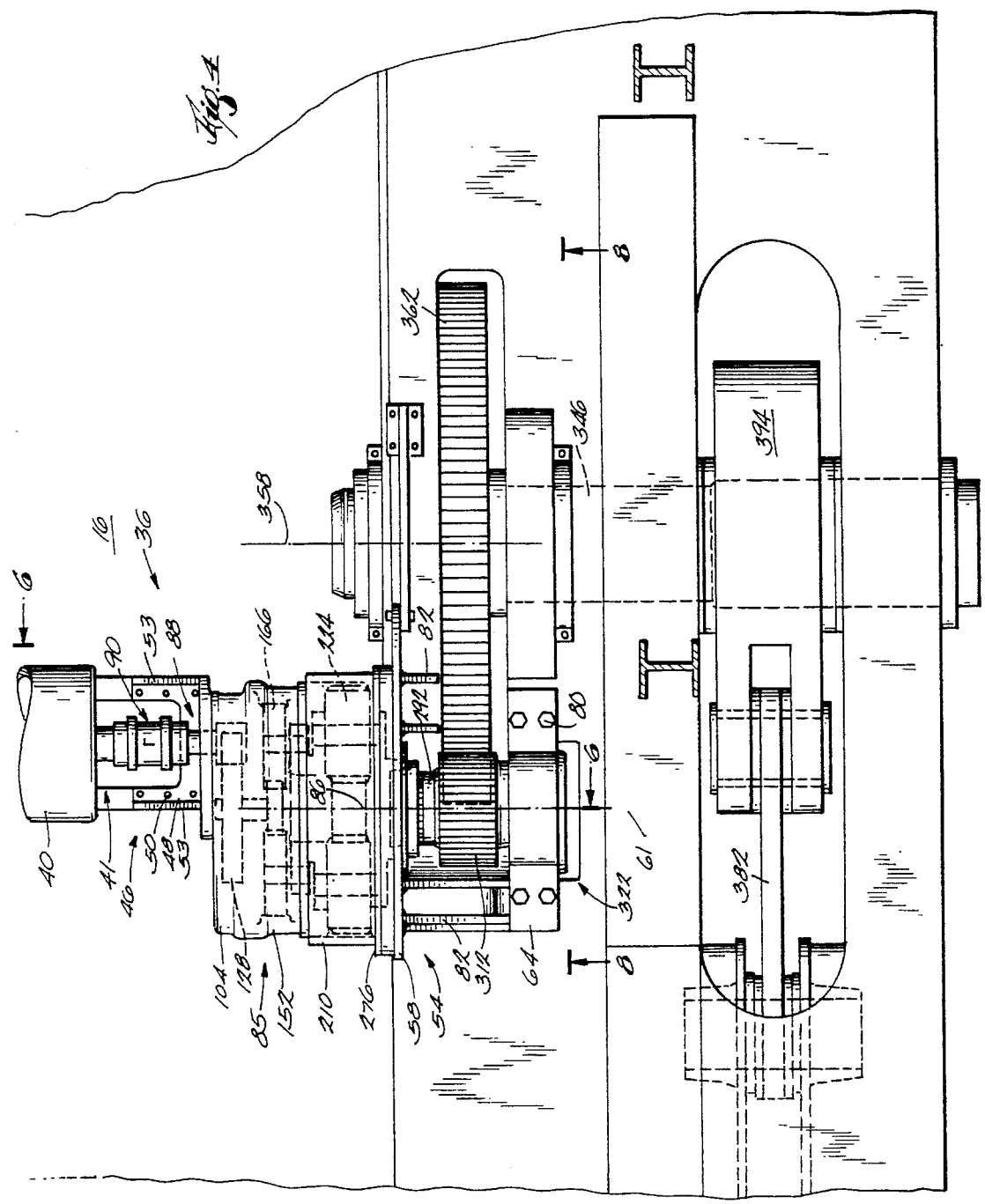
FIG. 4 is an enlarged portion of FIG. 3.
Figure 5:
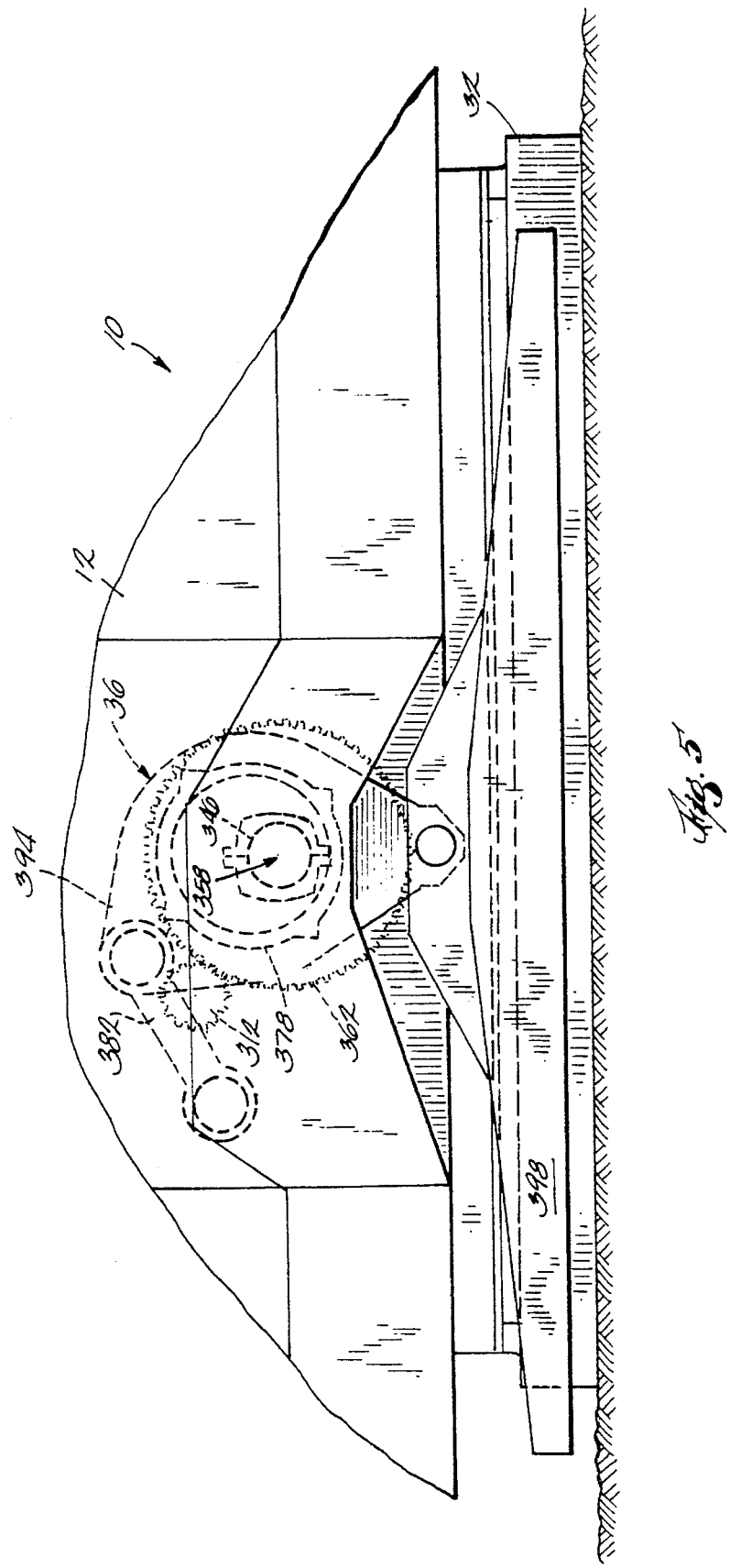
FIG. 5 is an enlarged portion of FIG. 1.

A dragline 10 embodying the invention is illustrated in the drawings. The dragline 10 comprises (FIG. 1) a main housing 12 including an operator's cab 14. The main housing 12 also includes (FIGS. 2–6) an upwardly facing deck or main housing floor 16. The main housing 12 also includes (FIGS. 2 and 3) a lifting apparatus 18 which is supported above the main housing floor 16 for lifting and moving components above the main housing floor 16 for repair and maintenance. In the illustrated embodiment, the lifting apparatus 18 comprises a pair (one shown in FIG. 3) of overhead cranes on the opposite sides of the main housing 12. Each of the overhead cranes 18 includes a bridge which is movable along a pair of rails, a trolley which is mounted on the bridge and which is movable along the bridge perpendicular to the rails, and a hoist which is mounted on the trolley and which is operable for lifting components above the main housing floor 16. The dragline 10 also includes (FIGS. 1–3) a bucket hoist mechanism 20 and a bucket drag mechanism 22, both of which are mounted on the main housing 12. Referring to FIG. 1, a boom 24 extends upwardly and outwardly from the main housing 12. The upper end of the boom 24 has thereon a sheave 26. The boom 24 is supported relative to the main housing 12 by conventional supporting structure 28. The dragline 10 also includes a bucket 29, a hoist rope 30 extending between the bucket hoist mechanism 20 and the bucket 29 and over the sheave 26 for causing vertical movement of the bucket 29, and a drag rope 31 extending between the bucket drag mechanism 22 and the bucket 29 for causing horizontal movement of the bucket 29. The dragline 10 further includes (FIGS. 1 and 5) a tub 32 which sits on the ground and thus supports the main housing 12 during digging operations. The dragline 10 also includes (shown best in FIGS. 1–5) a moving mechanism 34, further described below, which moves the main housing 12 over the ground between digging operations.

In the illustrated embodiment (FIGS. 1–3 and 5), the moving mechanism 34 comprises a pair of walking mechanisms 36 and 38. In another embodiment (not shown) the moving mechanism can be another mechanism, such as a set of crawler tracks, which is suitable for moving the dragline over the ground. When operated in unison, the walking mechanisms 36 and 38 lift the main housing 12 and tub 32 and move them a short distance. In the specific embodiment illustrated, the walking mechanisms 36 and 38 move the main housing about seven feet in each so-called "step". The walking mechanisms 36 and 38 are mirror images, and only the walking mechanism 36 will be described in further detail.

The walking mechanism 36 includes (FIGS. 2–4 and 6) a motor 40. In the illustrated embodiment, the motor 40 is an electric motor. In another embodiment (not shown), the motor can be an internal combustion engine. The motor 40 includes an output shaft 41. The output shaft 41 is rotatable about a generally horizontal axis 42. The motor 40 also includes a motor housing 43. The motor housing 43 includes (FIG. 6) a pair of mounting bars 44 (one shown). Each of the mounting bars 44 is fixed to the main housing floor 16 by a set of bolts 45. The motor 40 thus is fixed to the main housing floor 16.

The walking mechanism 36 includes (FIGS. 4 and 6) a cradle 46 which is mounted on the main housing floor 16. The cradle 46 includes a U-shaped base or lower portion 48 which is fixed to the main housing floor 16 by bolts 50. The cradle 46 also includes a vertical mounting plate 52 (see FIG. 6) which extends upwardly from the lower portion 48. The cradle 46 also includes a pair of plate gussets 53 (FIGS. 4 and 6) which are welded to the lower portion 48 and to the mounting plate 52 to provide support for the mounting plate 52.

Figure 7:
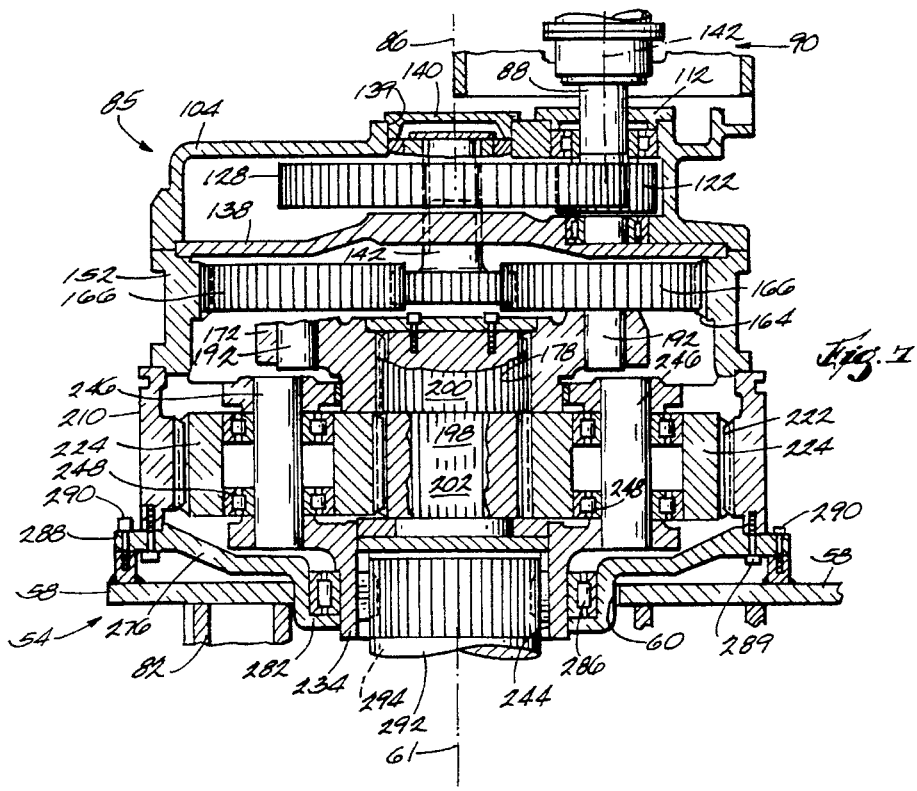
FIG. 7 is a view taken generally along line 7—7 in FIG. 6.
Figure 8:
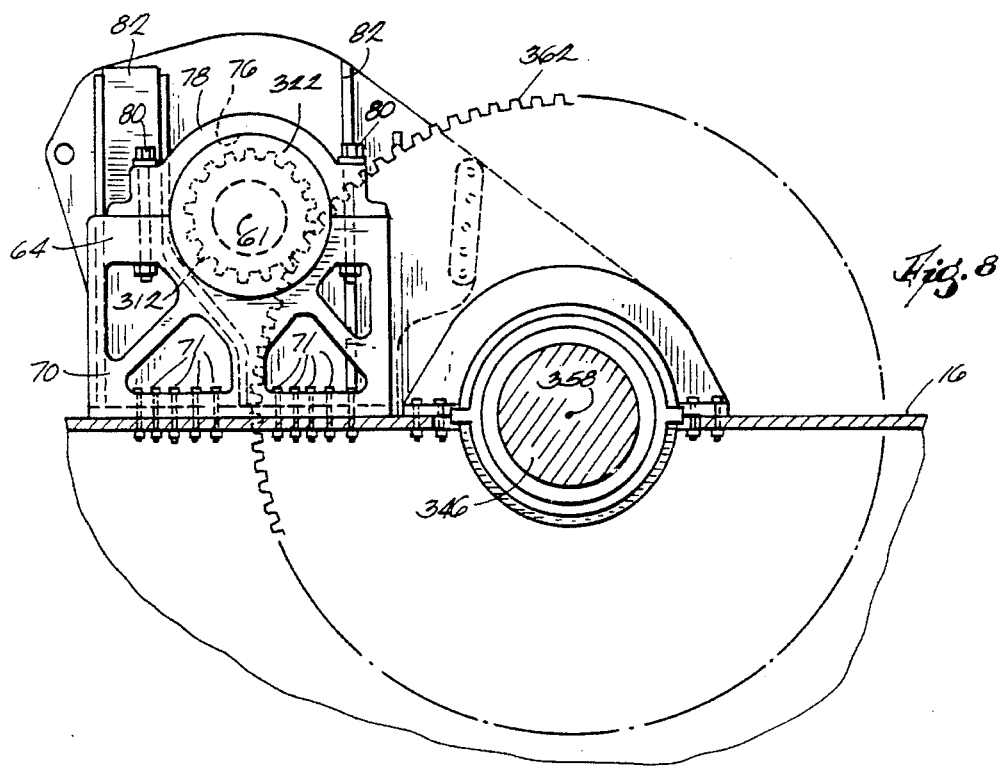
FIG. 8 is a view taken generally along line 8—8 in FIG. 4.

The walking mechanism 36 includes (FIGS. 4 and 6–7) a pedestal 54 which is spaced from the cradle 46. The pedestal 54 includes a base plate 55 fixed to the main housing floor 16 by bolts 56. The pedestal 54 includes an inboard leg 58 which extends upwardly from and is welded to the base plate 55. The inboard leg 58 has therein (FIG. 6) a circular inboard bore 60 which extends horizontally and which is centered on a horizontal axis 61. The pedestal 54 also includes (FIGS. 4 and 6) an outboard leg 64 which is spaced in the outboard direction (e.g. in the direction away from the motor 40) from the inboard leg 58. The outboard leg 64 includes (FIGS. 6 and 8) a base portion 70 which is welded to the base plate 55 and which is fixed to the main housing floor 16 by bolts 71. The base portion 70 extends upwardly from the main housing floor 16 and defines the lower half of a circular outboard bore 76 which extends horizontally. The outboard leg 64 also includes (FIGS. 4 and 6) a cap portion 78 which is removably fixed to the base portion 70 by bolts 80. The cap portion 78 defines the upper half of the outboard bore 76. When the cap portion 78 is fixed to the base portion 70, the cap portion 78 and base portion 70 cooperate to define (FIG. 6) the outboard bore 76. The outboard bore 76 is centered on the axis 61. The pedestal 54 further includes (FIGS. 4 and 6–8) brace plates or members 82 welded to the base plate 55, the inboard leg 58 and the outboard leg 64 to provide support for the inboard and outboard legs 58 and 64.

The walking mechanism 36 includes (FIGS. 2–7) a planetary transmission 85. The transmission 85 has (FIGS. 3–4 and 6–7) a generally horizontal center axis 86 coaxial with the axis 61. The transmission 85 includes an input shaft 88 which is generally coaxial with the motor output shaft 41 and which is rotatable about the axis 42. A spacer coupling 90 releasably and drivingly connects the motor output shaft 41 to the transmission input shaft 88. The spacer coupling 90 includes a first hub 91 which is releasably connected to the motor output shaft 41, a second hub 92 which is releasably connected to the transmission input shaft 88, and a center member or spacer 93 releasably connected between the first and second hubs 91 and 92. The spacer coupling 90 thus drivingly connects the motor output shaft 41 to the transmission input shaft 88. The spacer 93 is removable such that the transmission 85 is moveable inwardly toward the motor 40.

The transmission 85 includes (FIGS. 6–7) an input end housing 104 which is mounted on the mounting plate 52 of the cradle 46 (shown in FIG. 6) by bolts 106. The input end housing 104 supports (FIG. 6) inner and outer bearings 108 and 110 which in turn rotatably support the transmission input shaft 88. A sealing cap 112 (FIGS. 6–7) surrounds the transmission input shaft 88 and is fixed to the input end housing 104 by suitable means such as bolts or screws (not shown).

The transmission 85 includes (FIGS. 4 and 6-7) an input pinion 122 fixed to the input shaft 88 for common rotation therewith about the axis 42. The input pinion 122 can either be integral with the input shaft 88 or be fixed to the input shaft 88 such as by splines.

Figure 6:
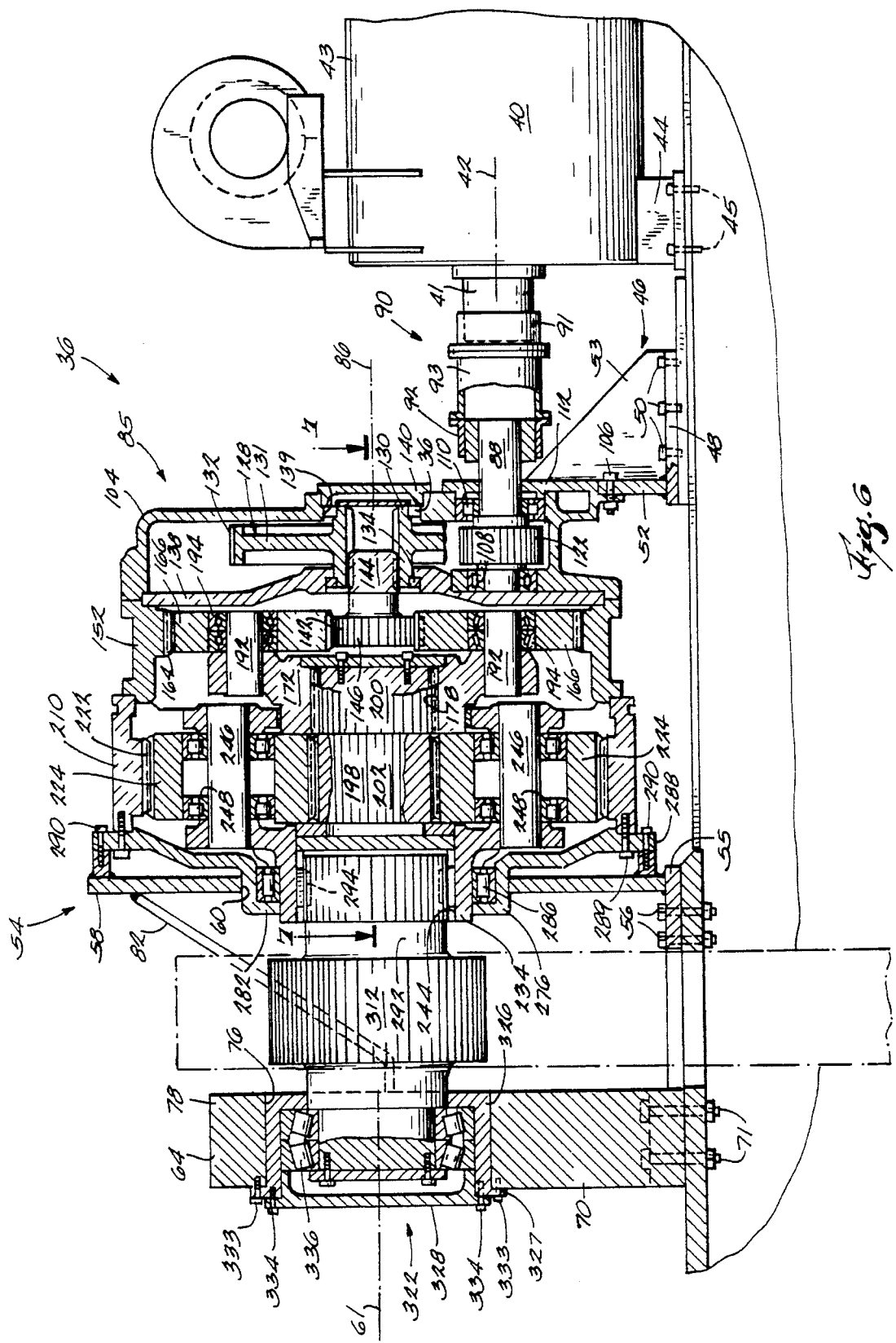
FIG. 6 is a view taken generally along line 6—6 in FIG. 4, with parts removed for clarity.

The transmission 85 also includes a reduction gear 128 supported for rotation about the center axis 86. The reduction gear 128 includes (FIG. 6) a central hub portion 130, a web 131 extending radially outwardly from the hub portion 130, and gear teeth 132 extending radially outwardly from the web 131. The hub portion 130 is rotatably supported by inner and outer bearings 134 and 136 (FIG. 6). The inner bearing 134 is supported by a bearing support member 138, and the outer bearing 136 is seated in a bore 139 in the input end housing 104. The bearing support member 138 is fixed to the input end housing 104 by suitable means such as bolts or screws (not shown). A sealing cap 140 closes the bore 139 in the input end housing 104.

The transmission 85 includes (FIGS. 4 and 6–7) a first sun gear 142. The sun gear 142 includes a shaft portion 144 spline fit to the hub of the reduction gear 128. The sun gear 142 thus is fixed to the reduction gear 128 for common rotation therewith about the center axis 86. The sun gear 142 also includes a toothed portion 146 which is integral with the shaft portion 144.

The transmission 85 includes (FIGS. 6–7) a first ring gear 152. The ring gear 152 is fixed to the input end housing 104 by suitable means such as bolts or screws (not shown). The ring gear 152 includes radially inwardly extending gear teeth 164. The ring gear 152 is centered on the center axis 86.

The transmission 85 includes (FIGS. 6–7) four identical first planet gears 166 (two shown). The planet gears 166 are spaced equidistant from one another about the sun gear 142. Each planet gear 166 meshes with the sun gear 142 and with the ring gear teeth 164. The planet gears 166 thus are driven by the sun gear 142 and revolve around the sun gear 142 and the center axis 86.

The transmission 85 includes (FIGS. 6–7) a first carrier 172. The carrier 172 has a central bore 178 which extends horizontally and which is centered on the center axis 86. Each of the planet gears 166 is drivingly connected to the carrier 172 by a respective pin 192. Each pin 192 supports a bearing 194 (FIG. 6) which in turn rotatably supports the respective planet gear 166. Each pin 192 is housed in and extends from a respective bore in the carrier 172. The carrier 172 thus is connected to the planet gears 166 by the pins 192 such that revolution of the planet gears 166 around the center axis 86 causes rotation of the carrier 172 about the center axis 86.

The transmission 85 includes (FIGS. 6–7) a second sun gear 198. The sun gear 198 includes a shaft portion 200 which is housed in the carrier bore 178 and which is spline fit to the carrier 172. The sun gear 198 thus is fixed to the carrier 172 for common rotation therewith about the center axis 86. The sun gear 198 also includes a toothed portion 202 which is integral with the shaft portion 200.

The transmission 85 includes (FIGS. 4 and 6–7) a second ring gear 210. The ring gear 210 is fixed to the ring gear 152 by suitable means such as bolts or screws (not shown). The ring gear 210 includes (FIGS. 6–7) radially inwardly extending gear teeth 222. The ring gear 210 is centered on the center axis 86.

The transmission 85 includes (FIGS. 4 and 6–7) four identical second planet gears 224 (two shown). The planet gears 224 are spaced equidistant from one another about the sun gear 198. Each planet gear 224 meshes with the sun gear 198 and with the ring gear teeth 222. The planet gears 224 thus are driven by the second sun gear 198 and revolve around the second sun gear 198 and the center axis 86.

The transmission 85 includes (FIGS. 6–7) a second carrier 234. The carrier 234 has a central bore 244 which extends horizontally and which is centered on the center axis 86. Each of the planet gears 224 is drivingly connected to the carrier 234 by a respective pin 246. Each pin 246 supports bearings 248 which in turn rotatably support the respective planet gear 224. Each pin 246 is housed in a respective pair of spaced bores in the carrier 234. The carrier 234 thus is connected to the planet gears 224 by the pins 246 such that revolution of the planet gears 224 around the center axis 86 causes rotation of the carrier 234 about the center axis 86.

The transmission 85 includes (FIGS. 4 and 6–7) a pilot member 276. The pilot member 276 includes an annular projection 282 which surrounds the carrier 234 and which is housed in the inboard bore 60 of the inboard leg 58 of the pedestal 54. The annular projection 282 supports (FIGS. 6–7) a bearing 286 which in turn rotatably supports the carrier 234. The pilot member 276 also includes an annular flange 288 which extends radially outwardly from the annular projection 282. The annular flange 288 is fixed to the ring gear 210 by a set of circumferentially spaced bolts 289 and is fixed to the inboard leg 58 by a set of circumferentially spaced bolts 290. The inboard leg 58 of the pedestal 54 thus supports the pilot member 276 and thereby the transmission 85 above the main housing floor 16.

The walking mechanism 36 includes (FIGS. 3–4 and 6–8) an output shaft 292 which is centered on the center axis 86. The output shaft 292 includes (FIGS. 4 and 6) opposite inner and outer or right and left ends. The inner or right end (FIGS. 6 and 7) extends into the carrier bore 244 and is spline fit at 294 to the carrier 234. The output shaft 292 thus is fixed to the carrier 234 for common rotation therewith about the center axis 86. The output shaft 292 is selectively releasable from the carrier 234 by moving the inner or right end away from and out of the carrier 234 in the direction along the center axis (to the left in FIG. 6), as further described below.

The walking mechanism 36 includes (FIGS. 2–6 and 8) an output pinion 312. The output pinion 312 is fixed to the output shaft 292 intermediate the ends for common rotation therewith about the center axis 86. The output pinion 312 can either be integral with the output shaft 292 or be fixed to the output shaft 292 such as by splines. The output pinion 312 has an outer diameter less than the inner diameter of the outboard bore 76.

The walking mechanism 36 includes (FIGS. 4, 6 and 8) a bearing capsule 322 which is supported in the outboard bore 76. The bearing capsule 322 includes (FIG. 6) an annular outer wall 326 which abuts the outboard leg 64. The outer wall 326 has thereon a radially outwardly extending flange 327 abutting the outboard leg 64. A set of bolts 333 extend through the radial flange 327 and into the outboard leg 64. The bearing capsule 322 thus is removably housed in the outboard bore 76. The bearing capsule 322 also includes a cover plate 328 which is attached to the outer wall 326 by bolts 334. The outer wall 326 and cover plate 328 cooperate to define a bearing cavity. The bearing cavity contains a bearing 336 centered on the center axis 86. The outer end of the output shaft 292 is received in the bearing cavity and is rotatably supported by the bearing 336. The output shaft 292 thus is rotatably supported by the outboard leg 64 of the pedestal 54 and by the carrier 234 for rotation about the center axis 86.

The components of the walking mechanism 36 as hereinafter described are as set forth in detail in U.S. Pat. No. 5,245,882, which is hereby incorporated by reference.

The walking mechanism 36 includes (FIGS. 4 and 8) a main walk shaft 346. The main walk shaft 346 is rotatably supported on the main housing 12 for rotation about a generally horizontal axis 358. A driven gear 362 (FIGS. 2–5 and 8) is fixed to the main walk shaft 346 for common rotation therewith about the axis 358. The driven gear 362 thus is rotatably supported by the main housing 12 for rotation relative thereto about the axis 358. The driven gear 362 meshes with and is driven by the output pinion 312.

The walking mechanism 36 includes (FIG. 5) a driven eccentric 378 which is fixed to the main walk shaft 346 for common rotation therewith about the axis 358. The driven eccentric 378 thus is driven by the driven gear 362 and is supported by the main housing 12 for rotation relative thereto about the axis 358.

The walking mechanism 36 includes (FIGS. 4 and 5) a knee link 382. One end of the knee link 382 is pivotally connected to the main housing 12. A walk leg housing 394 is connected to the other end of the knee link 382 and to the driven eccentric 378 such that rotation of the driven eccentric 378 causes walking movement of the walk leg housing 394.

The walking mechanism 36 includes (FIGS. 1–2 and 5) a shoe 398. The shoe 398 is fixed to the walk leg housing 394 for engaging the ground during walking movement of the walk leg housing 394.

In operation of the walking mechanism 36 to move the main housing 12 across the ground, the motor 40 is operated to cause rotation of the motor output shaft 41 and thus drive the transmission input shaft 88. The input pinion 122 rotates in common with the input shaft 88 and drives the reduction gear 128. The sun gear 142 rotates in common with the reduction gear 128 and drives the planet gears 166 to revolve around the sun gear 142 and inside the ring gear 152. The planet gears 166 are connected to the carrier 172 via the pins 192 and thus drive the carrier 172. The sun gear 198 rotates in common with the carrier 172 and drives the planet gears 224 to revolve around the sun gear 198 and inside the ring gear 210. The planet gears 224 are connected to the carrier 234 via the pins 246 and thus drive the carrier 234. The output shaft 292 rotates in common with the carrier 234. The output pinion 312 rotates in common with the output shaft 292 and drives the driven gear 362. The driven gear 362 is fixed to and drives the main walk shaft 346 and thus drives the driven eccentric 378. Rotation of the driven eccentric 378 causes walking movement of the walk leg housing 394. The shoe 398 moves with the walk leg housing 394 and engages the ground for lifting and moving the main housing 12.

When it is necessary to remove the transmission 85 for repair or replacement, the transmission 85 can readily be removed from the cradle 46 and pedestal 54 with the overhead crane 18. The transmission 85 can be removed by removing the spacer 93 and thus disconnecting the transmission input shaft 88 from the motor output shaft 41, removing the bolts 290 connecting the pilot member 276 to the pedestal 54, removing the bolts 50 securing the cradle 46 to the main housing floor 16, and moving the transmission 85 and the cradle 46 toward the motor 40 (to the right in FIG. 6) to remove the annular projection 282 of the pilot member 276 from the inboard bore 60 of the pedestal 54. Also, the transmission must be moved far enough to disconnect the transmission output shaft 292 from the second carrier 234, or the output shaft 292 must be moved in the opposite direction (to the left in FIG. 6) far enough to disconnect the transmission output shaft 292 from the second carrier 234. Once the transmission is clear of both the pedestal 54 and the output shaft 292, the transmission 85 and the cradle 46 can be lifted away from the pedestal 54. Alternatively, rather than disconnecting the cradle 46 from the floor 16, the transmission 85 could be disconnected from the cradle 46 (by removing the bolts 106) and then moved relative to the cradle 46. This is not preferred, however, because it is easier to move the cradle 46 with the transmission 85 than to move the transmission 85 relative to the cradle 46.

The output shaft 292 can be removed from the central bore 244 of the second carrier 234 by two different methods. According to a first method, the bolts 333 are removed from the outboard leg 64 and from the radial flange 327 of the bearing capsule 322, and the bearing capsule 322 and the output shaft 292 are moved outwardly (to the left in FIG. 6) along the center axis 86 and through the outboard bore 76. The output shaft 292 thus can be disconnected from the second carrier 234 by pulling the output shaft 292 and the output pinion 312 through the outboard bore 76, without removing the cap portion 78 from the base portion 70 of the outboard leg 64.

A second method for removing the output shaft 292 is to remove the bolts 333 from the outboard leg 64 and from the radial flange 327 of the bearing capsule 322, remove the cap portion 78 from the base portion 70 of the outboard leg 64, move the bearing capsule 322 and the output shaft 292 outwardly along the center axis 86 to disengage the output shaft 292 from the second carrier 234, and then lift the bearing capsule 322, the output shaft 292 and the output pinion 312 away from the base portion 70 of the outboard leg 64. The output shaft 292 and output pinion 312 thus are removable without removing the transmission 85 from the cradle 46 and pedestal 54, and without removing the driven gear 362 from the main walk shaft 346.

The transmission 85 and motor 40 are mounted on the main housing floor 16 and can be accessed for repairs and maintenance by personnel standing on the main housing floor 16, so elevated platforms are not required. The driven gear, the main walk shaft, the eccentric and the walk leg housing can be reached and lifted with a crane.

The input end housing 104, first ring gear 152, second ring gear 210 and pilot member 276 together comprise a fluid-tight housing of the transmission 85. The housing contains lubrication fluid in which the internal components of the transmission 85 are immersed. The components of the transmission 85 thus are not exposed for external lubrication.

The transmission 85 is suitable for use in either walking mechanism 36 or 38. More particularly, the input shaft 88 is positioned in a desired position by rotating the transmission 85 about the center axis 86 and then mounting the transmission 85 in the desired orientation. The output shaft 292 is centered on the center axis 86, and the position of the output shaft 292 thus is not affected by rotating the transmission about the center axis 86.

Various features of the invention are set forth in the following claims.

What is claimed is:

1. A dragline comprising
a main housing having a generally horizontal, upwardly facing surface,
a bucket hoist mechanism mounted on said housing,
a bucket drag mechanism mounted on said main housing,
a walking mechanism for moving said main housing over the ground, said walking mechanism including
a motor mounted on said main housing,
a planetary transmission which is mounted on said main housing and which is driven by said motor,
a transmission output shaft driven by said transmission,
a walk leg housing connected to said output shaft such that rotation of said output shaft causes walking movement of said walk leg housing, and
a shoe fixed to said walk leg housing for engaging the ground during walking movement of said walk leg housing,
a boom extending from said main housing,
a bucket,
a hoist rope extending between said bucket and said bucket hoist mechanism and over said sheave for causing vertical movement of said bucket,
a drag rope extending between said bucket and said bucket drag mechanism for causing horizontal movement of said bucket,
a pedestal fixed to said main housing floor, said pedestal including a leg extending upwardly, said leg having therein a circular bore, and
a pilot member including an annular projection housed in said bore, said pilot member being fixed to said transmission.

2. A dragline as set forth in claim 1 wherein said pilot member also includes an annular flange extending radially outwardly from said annular projection, said flange being fixed to said pedestal and to said transmission.

3. A dragline as set forth in claim 1 and further comprising a cradle fixed to said planetary transmission and to said main housing for supporting said transmission above said main housing floor.

4. A dragline as set forth in claim 1 wherein said motor includes an output shaft rotatable about a generally horizontal axis, wherein said transmission has a generally horizontal center axis, and wherein said dragline further comprises a planetary transmission input shaft which is generally coaxial with said motor output shaft and which drives said transmission, and a spacer drivingly connecting said motor output shaft to said planetary transmission input shaft.

5. A dragline as set forth in claim 4 wherein said spacer is removable from said motor output shaft and from said transmission input shaft such that said transmission is moveable inwardly toward said motor to disengage said pilot member from said bore so that said transmission can thereafter be lifted relative to said main housing floor.

6. A dragline as set forth in claim 4 wherein said transmission includes an input end housing rotatably supporting said input shaft, an input pinion fixed to said input shaft for common rotation therewith, a reduction gear supported by said input end housing for rotation relative thereto about said center axis, said reduction gear being driven by said input pinion, a sun gear fixed to said reduction gear for common rotation therewith about said center axis, a ring gear fixed to said input end housing and centered on said center axis, a plurality of planet gears which are driven by said sun gear, which mesh with said ring gear and which revolve around said center axis, and a carrier connected to said planet gears by respective pins such that revolution of said planet gears around said center axis causes rotation of said carrier about said center axis, and wherein said carrier drives said transmission output shaft.

7. A dragline as set forth in claim 6 wherein said transmission output shaft has inner and outer ends, said inner end of said transmission output shaft being spline fit to said carrier for common rotation of said transmission output shaft with said carrier, wherein said pedestal also includes an outboard leg which is spaced from said first-mentioned leg and which has therein an outboard bore centered on said center axis, and wherein said dragline further comprises an output pinion which drives said walk leg housing and which is mounted on said transmission output shaft intermediate said inner and outer ends thereof for common rotation therewith, and a bearing capsule housed in said outboard bore, said bearing capsule rotatably supporting said outer end of said transmission output shaft.

8. A dragline as set forth in claim 7 wherein said walking mechanism also includes a driven gear rotatably supported by said main housing for rotation relative thereto about a generally horizontal driven gear axis, said driven gear being driven by said output pinion, and a driven eccentric which is supported by said main housing for rotation relative thereto about said driven gear axis, which is driven by said driven gear, and which drives said walk leg housing.

9. A dragline as set forth in claim 8 wherein said walk leg housing is connected to said driven eccentric and connected to said main housing by a knee link such that rotation of said driven eccentric causes walking movement of said walk leg housing.

10. A dragline as set forth in claim 1 wherein said transmission includes a fluid-tight transmission housing adapted to contain lubrication fluid.

11. A dragline comprising
a main housing,
a bucket hoist mechanism mounted on said housing,
a bucket drag mechanism mounted on said main housing,
a moving mechanism for moving said main housing over the ground, said moving mechanism including a motor mounted on said main housing, a planetary transmission which is mounted on said main housing, which has a generally horizontal center axis, and which is driven by said motor, a pedestal which is mounted on said main housing and which has therein a circular bore centered on said axis, and a pilot member including an annular projection housed in said bore, said pilot member being fixed to said transmission,
a boom extending from said main housing,
a bucket,
a hoist rope extending between said bucket and said bucket hoist mechanism and over said sheave for causing vertical movement of said bucket, and
a drag rope extending between said bucket and said bucket drag mechanism for causing horizontal movement of said bucket.

12. A dragline as set forth in claim 11 wherein said pilot member also includes an annular flange extending radially outwardly from said annular projection, said flange being fixed to said pedestal and to said transmission.

13. A dragline as set forth in claim 11 and further comprising a cradle fixed to said planetary transmission and to said main housing for supporting said transmission above said main housing.

14. A dragline as set forth in claim 11 wherein said motor includes an output shaft rotatable about a generally horizontal axis, and wherein said dragline further comprises a planetary transmission input shaft which is generally coaxial with said motor output shaft and which drives said transmission, and a spacer drivingly connecting said motor output shaft to said planetary transmission input shaft.

15. A dragline as set forth in claim 14 wherein said spacer is removable from said motor output shaft and from said transmission input shaft such that said transmission is moveable inwardly toward said motor to disengage said pilot member from said bore so that said transmission can thereafter be lifted relative to said main housing.

16. A dragline as set forth in claim 14 wherein said transmission includes an input end housing rotatably supporting said input shaft, an input pinion fixed to said input shaft for common rotation therewith, a reduction gear supported by said input end housing for rotation relative thereto about said center axis, said reduction gear being driven by said input pinion, a sun gear fixed to said reduction gear for common rotation therewith about said center axis, a ring gear fixed to said input end housing and centered on said center axis, a plurality of planet gears which are driven by said sun gear, which mesh with said ring gear and which revolve around said center axis, and a carrier connected to said planet gears by respective pins such that revolution of said planet gears around said center axis causes rotation of said carrier about said center axis.

17. A dragline as set forth in claim 16 wherein said projection surrounds and rotatably supports said carrier.

18. A dragline as set forth in claim 16 wherein said ring gear, said input end housing, and said pilot member cooperate to define a fluid-tight transmission housing adapted to contain lubrication fluid.

19. A dragline as set forth in claim 16 and further comprising a transmission output shaft having inner and outer ends, said inner end of said transmission output shaft being spline fit to said carrier for common rotation of said transmission output shaft with said carrier, wherein said pedestal also includes an outboard leg which has therein an outboard bore centered on said center axis, and wherein said dragline further comprises an output pinion mounted on said transmission output shaft intermediate said inner and outer ends thereof for common rotation therewith, and a bearing capsule housed in said outboard bore, said bearing capsule rotatably supporting said outer end of said transmission output shaft.

20. A dragline comprising
a main housing, said main housing having a generally horizontal, upwardly facing surface,
a bucket hoist mechanism mounted on said housing,
a bucket drag mechanism mounted on said main housing,
a walking mechanism for moving said main housing over the ground, said walking mechanism including
a motor mounted on said main housing floor, said motor including an output shaft rotatable about a generally horizontal axis,
a planetary transmission input shaft generally coaxial with said motor output shaft,
a spacer drivingly connecting said motor output shaft to said planetary transmission input shaft,
a planetary transmission having a generally horizontal center axis and including
an input end housing rotatably supporting said input shaft,
an input pinion fixed to said input shaft for common rotation therewith,
a reduction gear supported by said input end housing for rotation relative thereto about said center axis, said reduction gear being driven by said input pinion,
a first sun gear fixed to said reduction gear for common rotation therewith about said center axis,
a first ring gear fixed to said input end housing and centered on said center axis,
a plurality of first planet gears which are driven by said sun gear, which mesh with said ring gear and which revolve around said center axis,
a first carrier connected to said planet gears by respective pins such that revolution of said planet gears around said center axis causes rotation of said carrier about said center axis, a second sun gear fixed to said first carrier for common rotation therewith, a second ring gear fixed to said first ring gear and centered on said center axis, a plurality of second planet gears which are driven by said second sun gear, which mesh with said second ring gear and which revolve around said center axis, a second carrier connected to said second planet gears by respective pins such that revolution of said second planet gears around said center axis causes rotation of said second carrier about said center axis, a cradle fixed to said input end housing and to said main housing for supporting said input end housing above said main housing floor, a pedestal fixed to said main housing floor, said pedestal including inboard and outboard legs extending upwardly from said main housing floor, said legs being spaced in the direction of said center axis, said inboard leg having therein a circular inboard bore, and said outboard leg having therein a circular outboard bore, said bores being centered on said center axis, a pilot member including an annular projection housed in said inboard bore, said pilot member also including an annular flange extending radially outwardly from said annular projection, said flange being fixed to said inboard leg of said pedestal and to said second ring gear, said projection surrounding and rotatably supporting said second carrier, a transmission output shaft having inner and outer ends, said inner end of said transmission output shaft being spline fit to said second carrier for common rotation of said transmission output shaft with said second carrier, an output pinion mounted on said transmission output shaft intermediate said inner and outer ends thereof for common rotation therewith, a bearing capsule housed in said outboard bore, said bearing capsule rotatably supporting said outer end of said transmission output shaft, a driven gear rotatably supported by said main housing for rotation relative thereto about a generally horizontal driven gear axis, said driven gear being driven by said output pinion, a driven eccentric which is supported by said main housing for rotation relative thereto about said driven gear axis and which is driven by said driven gear, a walk leg housing connected to said driven eccentric and connected to said main housing by a knee link such that rotation of said driven eccentric causes walking movement of said walk leg housing, and a shoe fixed to said walk leg housing for engaging the ground during walking movement of said walk leg housing, said spacer being removable from said motor output shaft and from said transmission input shaft such that said transmission is moveable inwardly toward said motor to disengage said pilot member from said inboard bore after said flange is disconnected from said inboard leg, so that said transmission can thereafter be lifted relative to said main housing floor, a boom extending from said main housing, a bucket, a hoist rope extending between said bucket and said bucket hoist mechanism and over said sheave for causing vertical movement of said bucket, and a drag rope extending between said bucket and said bucket drag mechanism for causing horizontal movement of said bucket.

\* \* \* \* \*